United States Patent
Liu et al.

(10) Patent No.: US 8,842,184 B2
(45) Date of Patent: Sep. 23, 2014

(54) METHOD FOR DETERMINING A QUALITY MEASURE FOR A VIDEO IMAGE AND APPARATUS FOR DETERMINING A QUALITY MEASURE FOR A VIDEO IMAGE

(75) Inventors: De Bing Liu, Beijing (CN); Zhi Bo Chen, Beijing (CN); Xiao Dong Gu, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 3 days.

(21) Appl. No.: 13/320,553

(22) PCT Filed: Nov. 18, 2010

(86) PCT No.: PCT/CN2010/001850
§ 371 (c)(1),
(2), (4) Date: Nov. 29, 2012

(65) Prior Publication Data
US 2013/0070106 A1    Mar. 21, 2013

(51) Int. Cl.
*H04N 17/00* (2006.01)
(52) U.S. Cl.
CPC .................................. *H04N 17/004* (2013.01)
USPC ........... 348/180; 348/177; 348/178; 348/184; 348/189; 382/228; 382/260; 382/261; 382/264
(58) Field of Classification Search
USPC ........... 348/177, 178, 180, 184, 189; 382/228
See application file for complete search history.

(56) References Cited

U.S. PATENT DOCUMENTS

| 6,020,926 | A  | * | 2/2000 | Astle | 375/240.24 |
|---|---|---|---|---|---|
| 6,717,625 | B1 | * | 4/2004 | Thielemans | 348/745 |
| 7,916,965 | B2 | * | 3/2011 | Chiu et al. | 382/260 |
| 2005/0094889 | A1 | * | 5/2005 | Lin et al. | 382/261 |
| 2005/0100237 | A1 | * | 5/2005 | Kong et al. | 382/261 |
| 2006/0165163 | A1 | * | 7/2006 | Burazerovic et al. | 375/240.03 |
| 2009/0041373 | A1 | * | 2/2009 | Incesu et al. | 382/264 |
| 2009/0220168 | A1 | * | 9/2009 | Yamajo et al. | 382/260 |
| 2010/0239164 | A1 | * | 9/2010 | Wang | 382/172 |
| 2011/0243472 | A1 | * | 10/2011 | Chang et al. | 382/264 |
| 2011/0286522 | A1 | * | 11/2011 | Tong et al. | 375/240.12 |
| 2011/0317768 | A1 | * | 12/2011 | Liu et al. | 375/240.24 |
| 2012/0002896 | A1 | * | 1/2012 | Lertrattanapanich et al. | 382/260 |
| 2012/0019667 | A1 | * | 1/2012 | Moesle et al. | 348/180 |
| 2012/0230541 | A1 | * | 9/2012 | Miyamoto | 382/103 |

* cited by examiner

*Primary Examiner* — Jefferey Harold
*Assistant Examiner* — Humam Satti
(74) *Attorney, Agent, or Firm* — Robert D. Shedd; Xiaoan Lu

(57) ABSTRACT

Accurately estimating the image quality of video is still difficult, especially when there is no reference video available. A method for determining a quality measure for a video image comprises selecting a measuring point, such as a MB, determining a context area around the measuring point, calculating a variance of pixel values in the context area, calculating a variance of pixel values in the measuring point, calculating a relation between the two variances of pixel values, and averaging said relations for a plurality of measuring points, wherein a quality measure for a video image is obtained.

13 Claims, 4 Drawing Sheets a)

METHOD FOR DETERMINING A QUALITY MEASURE FOR A VIDEO IMAGE AND APPARATUS FOR DETERMINING A QUALITY MEASURE FOR A VIDEO IMAGE

This application claims the benefit, under 35 U.S.C. §365 of International Application PCT/CN2010/001850, filed Nov. 18, 2010.

FIELD OF THE INVENTION

This invention relates to a method for determining a video quality measure, and an apparatus for determining a video quality measure.

BACKGROUND

Video quality measurement is the basis of video coding and processing, and has attracted more and more attention from industries and academics. However accurately estimating the image quality of video is still difficult, especially when there is no reference video available. In this case, the only useful information can be obtained from the video itself. A common approach is to extract some features from the uncompressed video and then build a relationship between the extracted features and the video quality. The feature extraction is one of the most important steps. Common features used for quality assessment or quality measurement are blur, blockiness, and noise. Several feature extraction algorithms have been proposed in the last decades. However it is still a problem how to identify and extract more effective features for the video quality measurement with no reference.

SUMMARY OF THE INVENTION

The present invention solves at least some of the above-mentioned problems. It provides a new feature for image quality assessment and measurement without using a reference, also known as "no-reference" type of measurement. The feature is calculated based on a variance within a local area, and is called Context Variance (CV) herein since it refers to the context of a measuring position. The feature is highly related to video quality and can be very helpful for image quality assessment and measurement, such as video quality measurement. Except for the term Context Variance, the term variance is used in a mathematical sense herein, i.e. variance is the square of standard deviation.

In principle, a method for determining a quality measure for a video image comprises selecting a measuring point, such as a MB, determining a context area around the measuring point, calculating a variance of pixel values in the context area, calculating a variance of pixel values in the measuring point, calculating a relation between the two variances of pixel values, and averaging said relations for a plurality of measuring points, wherein a quality measure for a video image is obtained.

In particular, according to one aspect of the invention, a method for determining a quality measure for a video image comprises selecting a first encoding unit of the video image as a measuring point, determining a context area of the selected first encoding unit, calculating a variance of pixel values in the context area, calculating a variance of pixel values in the selected first encoding unit, calculating a relation between the variance of pixel values in the selected first encoding unit and the variance of pixel values in the context area, and averaging for a plurality of selected first encoding units said relations, wherein a quality measure for a video image is obtained. The context area comprises the selected first encoding unit and a plurality of second encoding units that are directly adjacent to the selected first encoding unit.

An apparatus for determining a quality measure for video images is disclosed in claim 11.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an exemplary image before and after quantization.

DETAILED DESCRIPTION OF THE INVENTION

Figure 1:
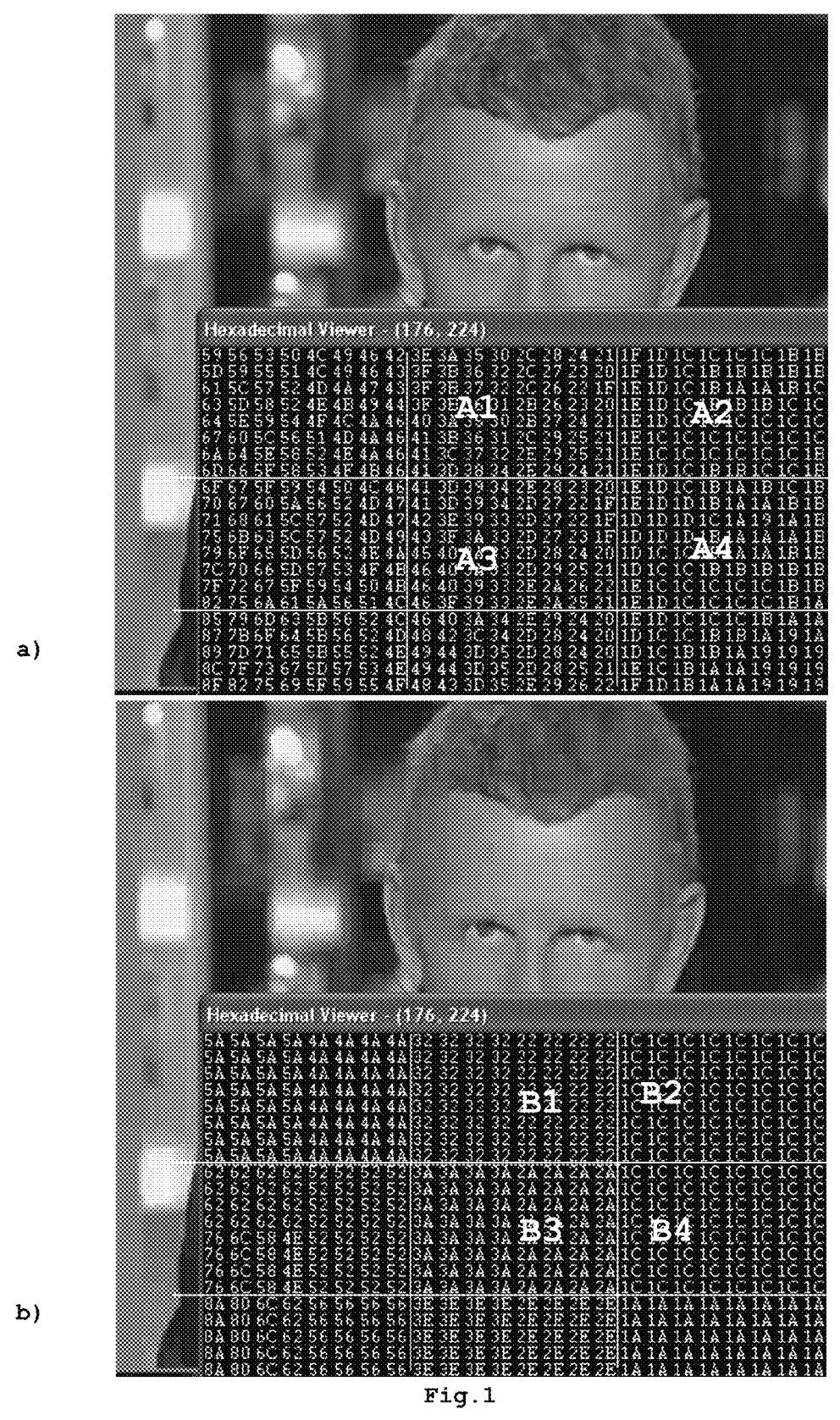
Figure 2:
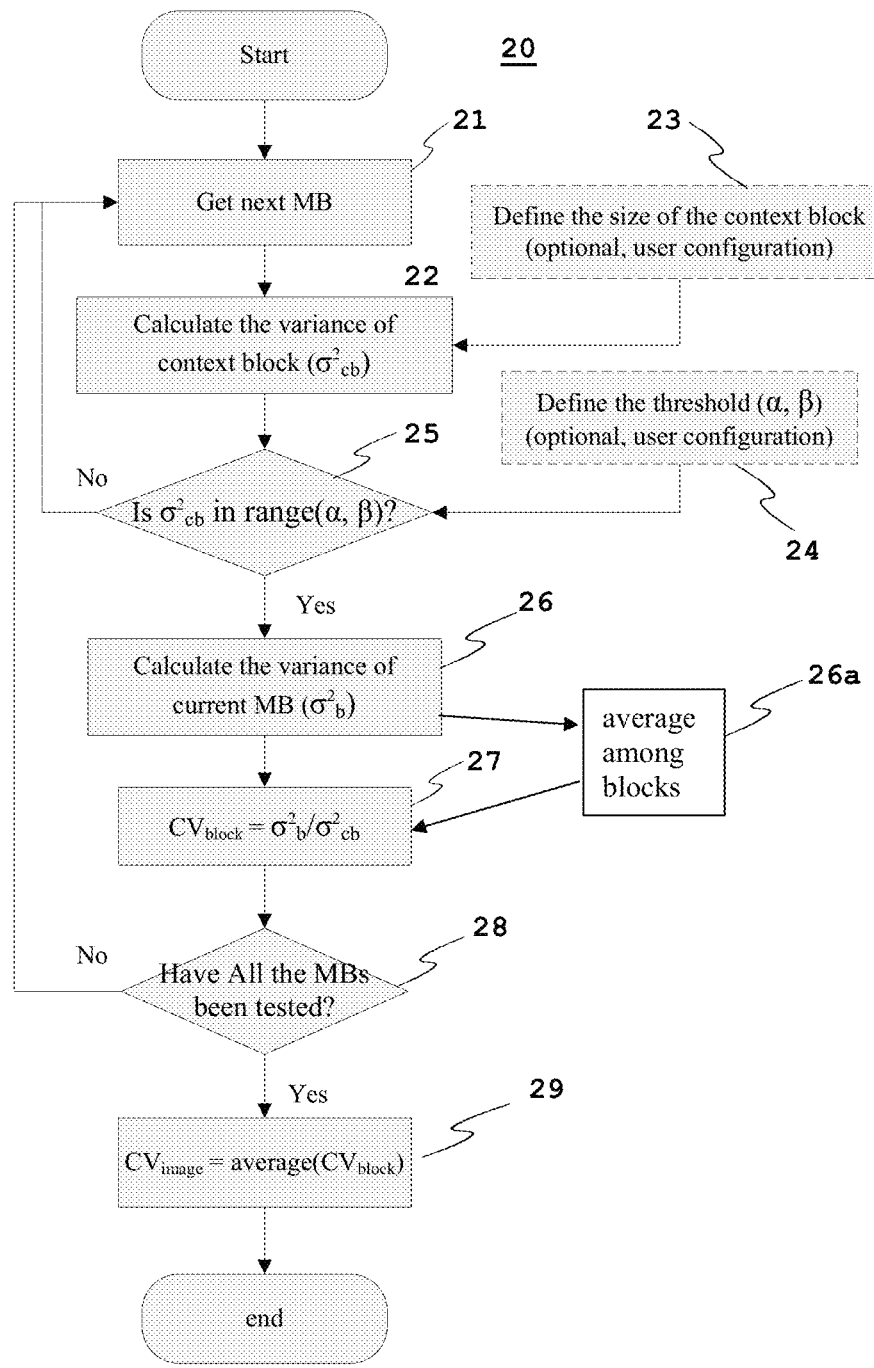
FIG. 2 a flow-chart of feature extraction.

FIG. 1 illustrates a basic observation that is used by the invention. While FIG. 1a shows pixel values of an original, non-quantized and undistorted video image, FIG. 1b shows the same portion of the same video image after quantization and inverse quantization. Any intermediate compression and decompression may insert further distortion. For compressed videos, when no transmission error occurs, the quality loss results mainly from the quantization. The quantization is always applied to an encoding unit, e.g. a block of pixels such as a macroblock (MB) or 8×8 block, which makes the pixels in the block tend to have similar or equal values. However, at the decoding side the quantization parameter is usually not known, so that it cannot be used for quality appraisal. In FIG. 1a and 1b, corresponding 8×8 blocks are shown. For example, the block A1 in the undistorted image corresponds to the block B1 in the distorted image. As can be seen, a wide variety of pixel values appears in blocks A1, . . . , A4 of the original image. Opposed to that, there are much less different pixel values in blocks B1, . . . , B4 of the distorted image, because detail information is lost during the quantization/de-quantization process. In several encoding units, such as B2, B4, all pixels of the distorted image have the same value. Generally, it is found that the variance of the pixel values in a quantized block will be lower as the quantization is higher (i.e. higher quantization parameter).

Another observation is that the variance of the pixels in neighbouring encoding units of a given encoding unit will not change very much as the quantization level is changed. Therefore the measuring method is largely independent from the actual quantization parameter value. A current encoding unit and at least adjacent portions of its neighbouring encoding units, e.g. a MB and at least adjacent portions of its neighbouring MBs, are defined herein as a "context block". Based on these observations, the variance of an encoding unit is used to measure the compressing distortion, and the variance of the encoding unit's context block is used to reduce the influence from the video content. Thus, the Context Variance that is obtained from the variance of the encoding unit and the variance of the context block can be used to measure video quality.

Some aspects of the invention are the following:

First, the variance of an encoding unit is used to measure the compressing distortion. The variance of the pixels in an encoding unit is often lower as the compressing distortion is higher.

Second, a context block is determined around the encoding unit, and the variance of the context block is used to reduce the influence of the image content. The variance of the context block (e.g. a current MB and its neighbouring blocks) won't change much as the compressing strength is changed. It is more related to video content. Therefore it can be used to reduce the influence from video content. Third, areas with too plain or too complicated texture can be excluded, which makes the result more stable. In a local area (or context) with too plain or too complicated texture, the calculated local context variance ($CV_{block}$) may be unstable. Excluding those areas can help to get better results. An example is given below with respect to FIG. 3.

In the following, the invention is described in detail. For most existing codecs, such as H.264 and MPEG2, the macroblock (MB) is the basic encoding unit. Therefore the MB is exemplarily used as a basic processing unit herein. In other embodiments, the processing unit may be different, such as a 24×24 pixel block or a 32×32 pixel block.

Figure 3:
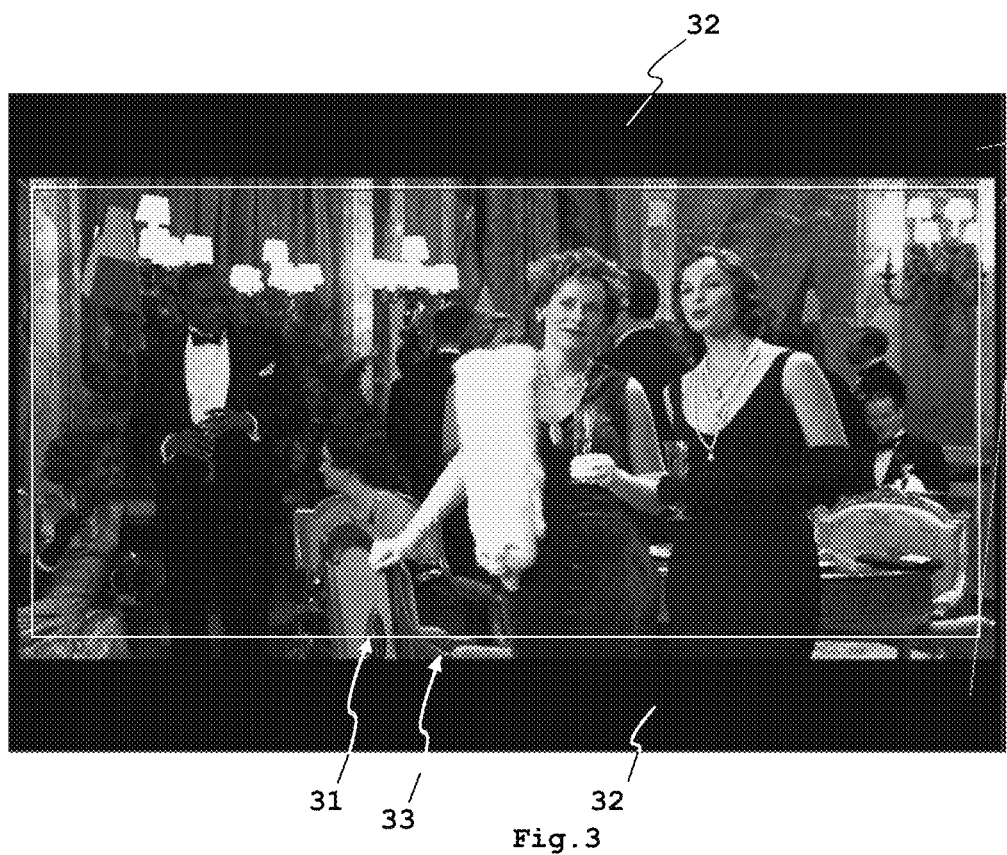
FIG. 3 an exemplary area in which an encoding unit can be selected.

FIG. 2 shows a flow-chart of one embodiment of the invention. In this embodiment, which uses MBs, extracting the CV feature from an image contains following main steps:

In a first step 21, a MB is selected to be processed next. FIG. 3 illustrates an example how to select a MB. In the embodiment of FIG. 3, only the MBs in the rectangle area 31 can be selected. In one embodiment, MBs at the image borders 33 cannot be selected: this rule is to ensure that a current MB has all neighbouring blocks (up, down, left, and right) available. The image border 33 usually has the width of one encoding unit.

In some videos, especially movies, there are black edges 32, mostly at the top and bottom, sometime also at left and right. In one embodiment, MBs in the black edges cannot be selected: If a current MB or any of its neighbouring blocks are completely or partially in a black edge, the calculation of its individual Context Variance $CV_{block}$ is skipped for the current MB, since any possible calculation result would be much different from the real value and therefore disturbing.

Figure 4:
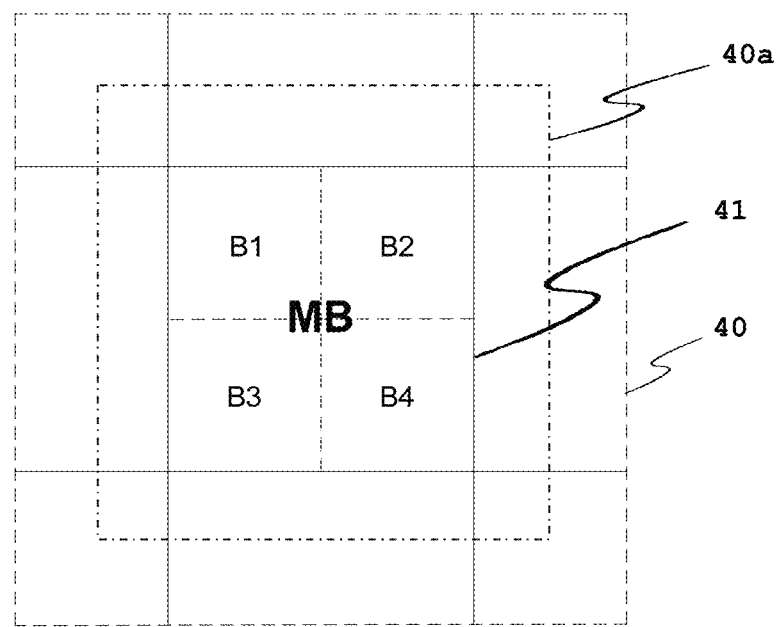
FIG. 4 an exemplary context of a macroblock.

In a second step 22, the variance of the context block ($\sigma^2_{cb}$) is calculated. FIG. 4 shows a context block 40 which includes a current MB 41 and its neighbouring blocks. Alternatively, a context block 40a may have a size of e.g. 24×24 pixels. It has been found that for a 16×16 MB this context block size is particularly advantageous, since it is close to the double size of the MB (MB size 256 pixels, context block size 576 pixels) and at the same time covers neighbours in all directions equally. Generally, the size of the context block should be [1.4, ..., 2.5] times the size of the measuring point (e.g. MB), so that the portions around the actual measuring point have [0.4, ..., 1.5] times the size of the measuring point. In one embodiment, the above-mentioned context block size is set as default size, and the actual size of the context block can optionally be modified through user configuration 23.

The variance of the context block can be calculated according to eq. (1), where $x_i$ is the value of the $i^{th}$ pixel, N is the number of pixels and $\bar{x}$ is the average value of all the pixels in the context block.

$$\sigma^2_{cb} = \frac{\sum_{i=1}^{N}(x_i - \bar{x})^2}{N-1} \qquad (1)$$

In a third step 25, check if $\sigma^2_{cb}$ is in a given range ($\alpha$, $\beta$). In an area with too plain or too complicated texture, the calculated local Context Variance ($CV_{block}$, see eq. (2) in step 5) may be far from the real value, so in the final calculation of the image Context Variance ($CV_{image}$), the local Context Variance ($CV_{block}$) of these areas is excluded. The range ($\alpha$, $\beta$) may have default values. An advantageous default value is e.g. $\alpha$=2 and $\beta$=2000, since it gives good results for most videos. Optionally, the range can be set or modified through user configuration 24. For videos with a high percentage of plain texture, $\alpha$ may be set a little lower, but not lower than 0.5; for videos with a high percentage of very complicated texture, $\beta$ may be set a little higher, but not higher than 10000.

In a fourth step 26, the variance $\sigma^2_b$ of the current selected MB is calculated. While a MB is the basic encoding unit for most codecs, quantization may also be applied on 8×8 blocks or even smaller, such as 4×4 blocks. In one embodiment, the MB is sub-divided, e.g. into four 8×8 sub-blocks (shown in FIG. 4), in order to better match the block size of the quantization. Then the variance of the four sub-blocks is calculated separately, and the MB variance is averaged 26a from the variances of the four sub-blocks.

In a fifth step 27, the local Context Variance ($CV_{block}$) is calculated according to eq. (2), in which the block variance $\sigma^2_b$ is related to video compression distortion and the context block variance $\sigma^2_{cb}$ is related to video content. Local Context Variance ($CV_{block}$) is a content independent quality metric. In eq. (2), if $\sigma^2_{cb}$ is too low, such as e.g. <0.1, a little difference on $\sigma^2_b$ may be magnified largely; if $\sigma^2_{cb}$ is too high, such as e.g. >10000, an obvious difference on $\sigma^2_b$ may be much reduced. Therefore the result is more stable if the areas whose $\sigma^2_{cb}$ is out of the range ($\alpha$, $\beta$) are excluded.

$$CV_{block} = \sigma^2_b / \sigma^2_{cb} \qquad (2)$$

Then it is checked 28 that the above-described steps 21, ..., 27 are repeated until all required MBs have been tested. As described below, the calculation may be required only for the MBs within a relevant area of the image. In one embodiment, the calculation is performed only for a given number of randomly selected MBs within the relevant area. In one embodiment, the calculation is performed only for MBs at defined positions within the relevant area, such as e.g. in a grid. In one embodiment, the calculation is performed for all MBs within the relevant area. In one embodiment, MBs are excluded when the variance of their context block $\sigma^2_{cb}$ is outside the defined range mentioned above.

Finally, in a sixth step 29, an image Context Variance is calculated. After the above-described steps 21, ..., 27 have been performed for all the required MBs, the image Context Variance ($CV_{image}$) can be calculated as the average of all the calculated local Context Variances ($CV_{block}$).

$$CV_{image} = \text{average}(CV_{block}) \qquad (3)$$

Figure 6:
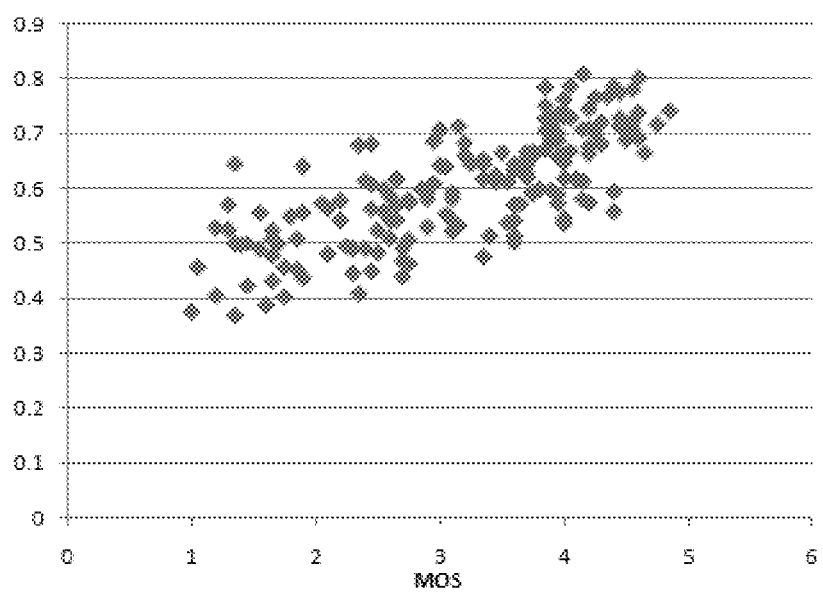
FIG. 6 exemplary correlation between Context Variance and perceptual quality.

The proposed scheme has been tested in a test database with 168 images with different content types and different quality levels. FIG. 6 shows the resulting correlation between context variance with perceptual quality: the Pearson correlation is about 0.75. This confirms that image Context Variance is highly related with its perceived quality. Thus, the present invention can be used for measuring the perceived video image quality, even in cases where no reference image is available.

Since block variance is much influenced by video content, it is often used to measure the video texture complexity. Thus, it may appear obvious to use variance also for video quality measurement. However, this would commonly require knowledge of the variance of the reference, in order to reduce the influence from the video content. Thus, obvious solutions are reference based metrics. Opposed to that, the present solution does not need any reference or metadata. Another unfavourable approach would be to calculate a variance only near edges in the image content, since this would require an image analysis and edge extraction over a complete image. Opposed to that, in the present invention the variance is calculated on any selected encoding unit and its context block, independent from the image content.

As mentioned above, the calculation may be performed only for selected encoding units and their context block. In one embodiment, a given number of encoding units are randomly selected from a relevant portion of the image, so that each image uses an individual set of e.g. 20 different measuring points. In another embodiment, encoding units are selected according to a regular or irregular grid, e.g. every $2^{nd}$ MB of every second $2^{nd}$ row of MBs, or every $4^{th}$ MB of every $4^{th}$ row of MBs or similar. In a further embodiment, the calculation is performed for each encoding unit within the above-described relevant area.

Figure 5:
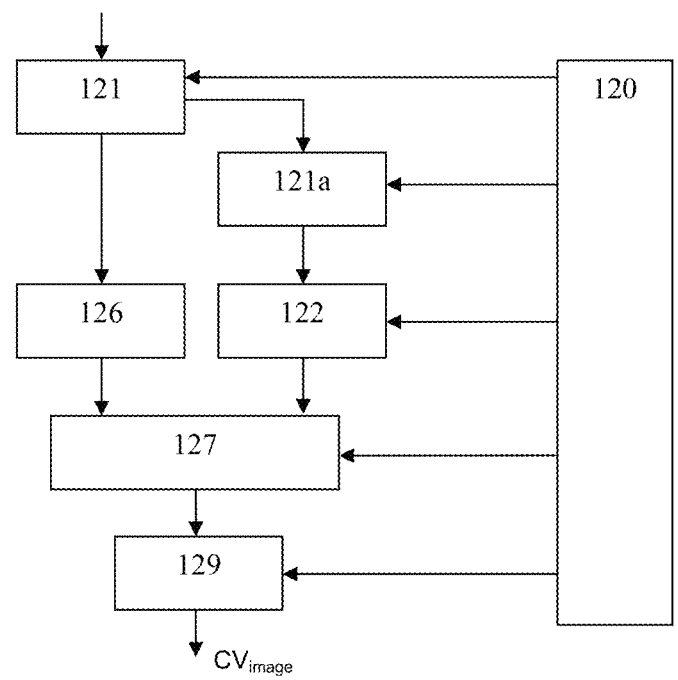
FIG. 5 a block diagram of an apparatus according to one embodiment of the invention.

FIG. 5 shows a block diagram of an apparatus according to one embodiment of the invention. The apparatus for determining a quality measure for a video image comprises selecting means 121 for selecting a first encoding unit of the video image, determining means 121*a* for determining a context area of the selected first encoding unit, first processing means 122 for calculating a variance of pixel values in the context area, second processing means 126 for calculating a variance of pixel values in the selected first encoding unit, third processing means 127 for calculating a relation between the variance of pixel values in the selected first encoding unit and the variance of pixel values in the context area, fourth processing means 129 for averaging for a plurality of selected first encoding units said relations, wherein a quality measure ($CV_{image}$) for a video image is obtained, and controller means 120 for controlling the selecting means 121, determining means 121*a* and processing means 122, 126, 127 for repeating their operation for a plurality of first encoding units. The context area comprises said selected first encoding unit and at least portions of a plurality of second encoding units that are directly adjacent to the selected first encoding unit.

One advantage of the invention is that no reference image is required. Another advantage of the invention is that the influence of the image content on the measuring result is strongly reduced. Thus, the feature is less related to video image content and highly related to video image quality. If enough measuring points are selected (e.g. more than 50% of all possible measuring points when evenly distributed), the measuring result can be considered as independent from the image content. A further advantage is that the measuring method is largely independent from the actual quantization parameter value that was used for encoding.

The invention may also be used for measuring compression distortion, i.e. distortion resulting from compression of a video image, where no reference image is available. In one embodiment, the method has a preceding step of decoding a video image, or decoding a sequence of video images received in a data stream.

Although the present invention has been disclosed with regard to video, one skilled in the art would recognize that the method and devices described herein may also be applied to any still picture.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. It is to be noted that while a common encoding unit is a macroblock for most codecs, the invention may also be applied to other encoding units, such as blocks.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The invention claimed is:

1. A method for determining a quality measure for a video image, comprising:

selecting a first encoding unit of the video image as a measuring point;

determining a context area of the selected first encoding unit, the context area comprising said selected first encoding unit and at least portions of a plurality of second encoding units that are directly adjacent to the selected first encoding unit;

calculating a variance of pixel values in the context area;

calculating a variance of pixel values in the selected first encoding unit;

calculating a relation between the variance of pixel values in the selected first encoding unit and the variance of pixel values in the context area; and averaging for a plurality of selected first encoding units said relations, wherein the quality measure for the video image is obtained responsive to the averaged relations, wherein the first encoding unit is selected from a relevant area within the video image, the relevant area comprising all encoding units of the video image except those on the edge of the video image or those whose context block has a variance $\sigma^2_{cb}$ outside a range $(\alpha,\beta)$ between $\alpha=2$ and $\beta=2000$.

2. Method according to claim 1, wherein no reference video image is used.

3. Method according to claim 1, wherein the relation $CV_{block}$ between the variance $\sigma^2_{cb}$ of pixel values in the selected first encoding unit and the variance $\sigma^2_{cb}$ of pixel values in the context area is a quotient according to $CV_{block}=\sigma^2_b/\sigma^2_{cb}$.

4. Method according to claim 1, wherein the variance of the pixel values in the context area is calculated according to $$\sigma_{cb}^2 = \frac{\sum_{i=1}^{N}(x_i - \overline{x})^2}{N-1}$$

wherein N is the total number of pixels in the context area, $x_i$ is a pixel value, and $\overline{x}$ is an average pixel value in the context area.

5. Method according to claim 1, wherein the selecting a first encoding unit, determining a context area of the selected first encoding unit, calculating a variance of pixel values in the context area, calculating a variance of pixel values in the selected first encoding unit and calculating a relation between the variance of pixel values in the selected first encoding unit and the variance of pixel values in the context area are performed only for a subset of encoding units in the relevant area of the video image.

6. Method according to claim 1, wherein the selecting a first encoding unit, determining a context area of the selected first encoding unit, calculating a variance of pixel values in the context area, calculating a variance of pixel values in the selected first encoding unit and calculating a relation between the variance of pixel values in the selected first encoding unit and the variance of pixel values in the context area are repeated for all encoding units in the relevant area of the video image.

7. An apparatus for determining a quality measure for a video image, comprising:
a selecting module configured to select a first encoding unit of the video image;
a determining module configured to determine a context area of the selected first encoding unit, the context area comprising said selected first encoding unit and at least portions of a plurality of second encoding units that are directly adjacent to the selected first encoding unit;
a first processing module configured to calculate a variance of pixel values in the context area;
a second processing module configured to calculate a variance of pixel values in the selected first encoding unit;
a third processing module configured to calculate a relation between the variance of pixel values in the selected first encoding unit and the variance of pixel values in the context area;
a fourth processing module configured to average for a plurality of selected first encoding units said relations, wherein the quality measure for the video image is obtained responsive to the averaged relations; and
a controller configured to control the selecting module, the determining module and the first, second, third and fourth processing modules for repeating their operation for a plurality of first encoding units; and an area defining module configured to select the first encoding unit from a relevant area within the video image, the relevant area comprising all encoding units of the video image except those on the edge of the video image or those whose context block has a variance $\sigma_{cb}^2$ outside a range $(\alpha,\beta)$ between $\alpha=2$ and $\beta=2000$.

8. Apparatus according to claim 7, wherein the selecting a first encoding unit, determining a context area of the selected first encoding unit, calculating a variance of pixel values in the context area, calculating a variance of pixel values in the selected first encoding unit and calculating a relation between the variance of pixel values in the selected first encoding unit and the variance of pixel values in the context area are performed by the respective modules only for a subset of encoding units in the relevant area of the video image.

9. Apparatus according to claim 7, wherein the selecting a first encoding unit, determining a context area of the selected first encoding unit, calculating a variance of pixel values in the context area, calculating a variance of pixel values in the selected first encoding unit and calculating a relation between the variance of pixel values in the selected first encoding unit and the variance of pixel values in the context area are performed by their respective modules for all encoding units in the relevant area of the video image.

10. A method for determining a quality measure for a video image, comprising:
selecting a first encoding unit of the video image as a measuring point;
determining a context area of the selected first encoding unit, the context area comprising said selected first encoding unit and at least portions of a plurality of second encoding units that are directly adjacent to the selected first encoding unit;
calculating a variance of pixel values in the context area;
calculating a variance of pixel values in the selected first encoding unit;
calculating a relation between the variance of pixel values in the selected first encoding unit and the variance of pixel values in the context area; and
averaging for a plurality of selected first encoding units said relations, wherein the quality measure for the video image is obtained responsive to the averaged relations, and wherein the first encoding unit is a macroblock of the video image and the second encoding units are sub-blocks, and the size of the context area is [1.4, . . . , 2.5] times the size of the first encoding unit.

11. Method according to claim 10, wherein a macroblock has 16×16 pixels, a sub-block has 4×4 pixels and a context area has 24×24 pixels.

12. An apparatus for determining a quality measure for a video image, comprising:
a selecting module configured to select a first encoding unit of the video image;
a determining module configured to determine a context area of the selected first encoding unit, the context area comprising said selected first encoding unit and at least portions of a plurality of second encoding units that are directly adjacent to the selected first encoding unit, wherein the first encoding unit is a macroblock of the video image and the second encoding units are sub-blocks, and the size of the context area is [1.4, . . . , 2.5] times the size of the first encoding unit;
a processing module configured to calculate a variance of pixel values in the context area; a first processing module configured to calculate a variance of pixel values in the selected first encoding unit;
a second processing module configured to calculate a relation between the variance of pixel values in the selected first encoding unit and the variance of pixel values in the context area;
a third processing module configured to average for a plurality of selected first encoding units said relations, wherein the quality measure for the video image is obtained responsive to the averaged relations; and
a controller configured to control the selecting module, the determining module and the first, second, third and fourth processing modules for repeating their operation for a plurality of first encoding units.

13. Apparatus according to claim 12, wherein a macroblock has 16×16 pixels, a sub-block has 4×4 pixels and a context area has 24×24 pixels.

* * * * *